Feb. 2, 1965  J. J. CONDON  3,168,304
ARRANGEMENT FOR POSITIONING SHEET MATERIAL FOR CUTTING
Filed Oct. 25, 1963  3 Sheets-Sheet 1

INVENTOR.
JAMES J. CONDON
BY
ATTORNEYS

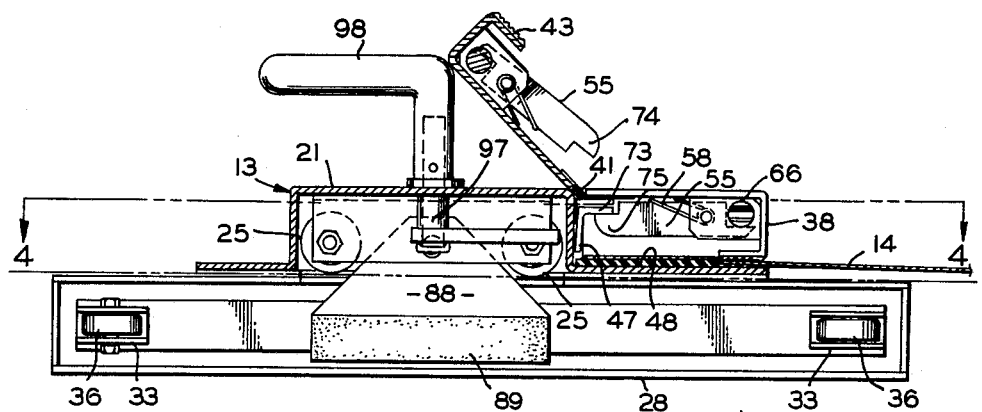
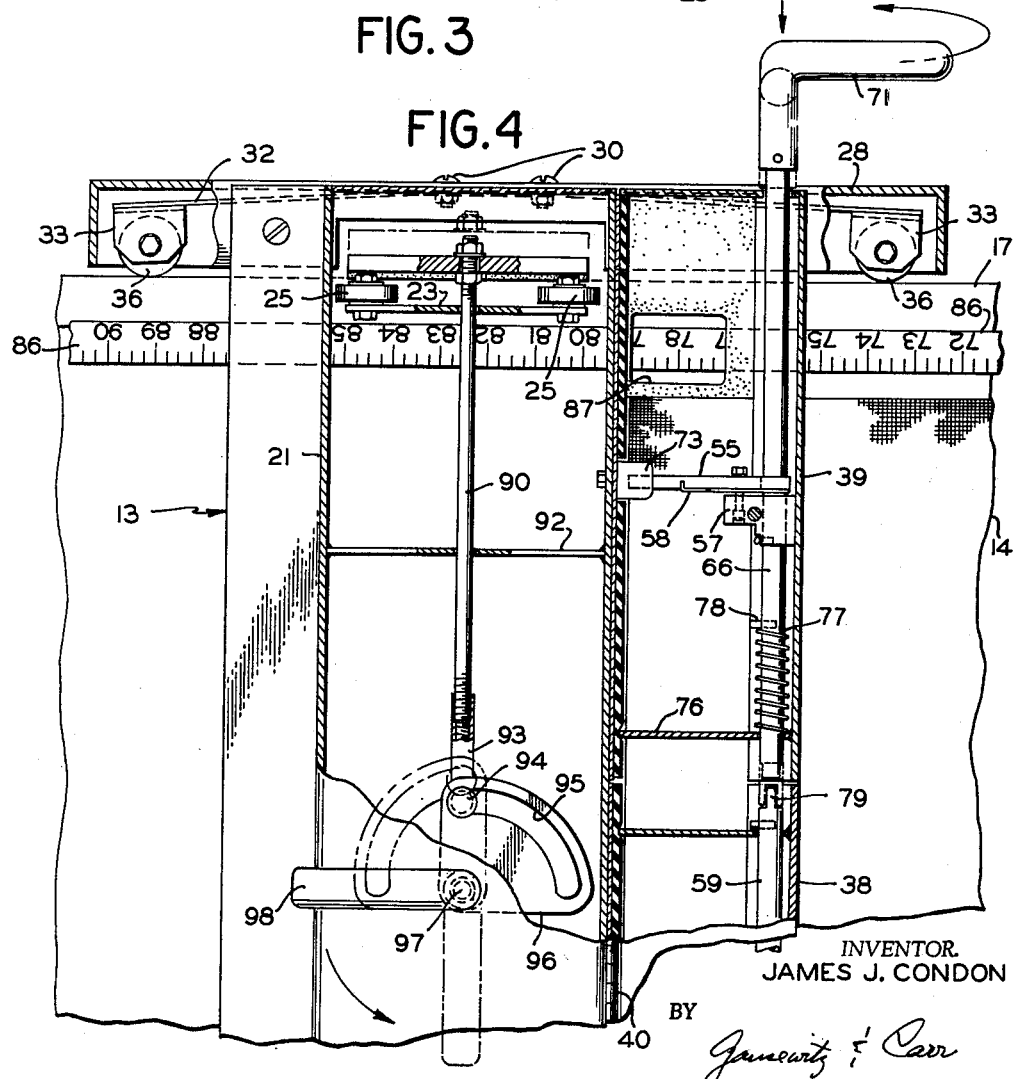

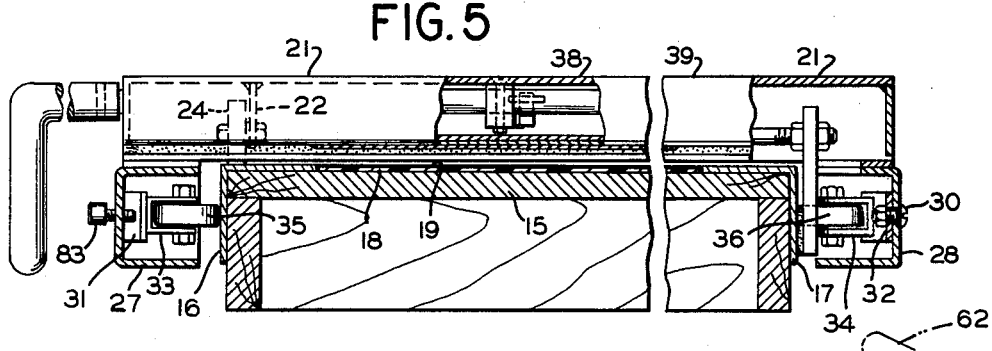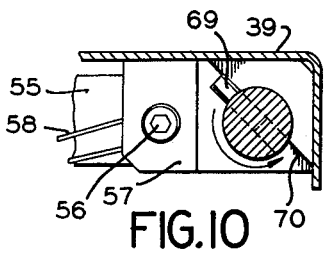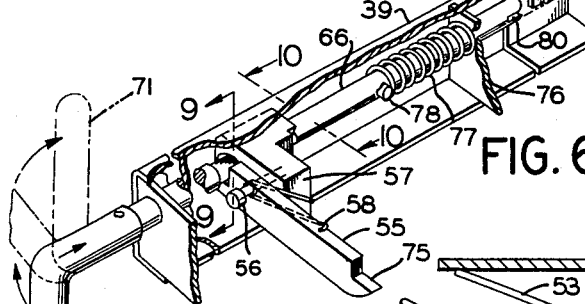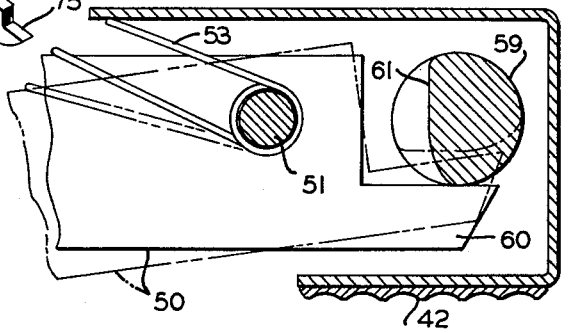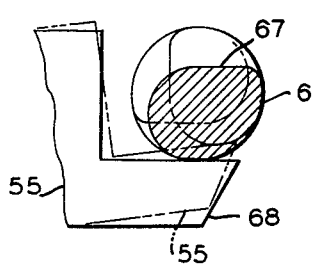
INVENTOR.
JAMES J. CONDON
ATTORNEYS

United States Patent Office 3,168,304
Patented Feb. 2, 1965

3,168,304
ARRANGEMENT FOR POSITIONING SHEET
MATERIAL FOR CUTTING
James J. Condon, 1442 W. Olive, Fullerton, Calif.
Filed Oct. 25, 1963, Ser. No. 318,890
12 Claims. (Cl. 269—304)

This invention pertains to a device for retaining sheet material, such as drapery cloth, for an operation such as cutting the material to a desired length.

In the manufacture of draperies, it is necessary, of course, to cut the draperies to an appropriate length, depending upon the size of the windows. The drapery manufacturer is called upon to produce draperies of many different lengths. In the past this has been entirely a hand operation, usually necessitating the spreading of the material out on a surface where it is smoothed out and held by manual insertion of pins. An effort must be made to assure parallelism of the two ends when the material is cut. Obviously, this is a lengthy and hence costly operation, the pinning alone taking a considerable amount of time. In addition, the results are far from perfect. Care must be exercised to make certain that the sheet of material is entirely flat so as to avoid all wrinkles. Alignment of top and bottom edges is very troublesome, and there is no assurance that the drapery will be of precisely the same length throughout its width.

The present invention provides a means for quickly and securely holding drapery material to a surface, permitting precise alignment and cutting to an exact length. The unit includes a carriage that is movable along a table and can be locked to any position along the length of the table as determined by a scale on the table top. The carriage includes a clamp that provides an accurately aligned surface against which the drapery material may be positioned. The clamp is locked in place by levers, at which time the cutting may be completed. The clamp unit is in two sections, but it is operable on one side alone for release. This saves valuable time by avoiding the necessity for the operator to move to both sides of the table in releasing the material upon the completed job.

An object of this invention is to provide a means for precisely positioning and aligning sheet material.

Another object of this invention is to provide a means for rapidly and efficiently cutting and completing draperies.

A further object of this invention is to provide a means to assure that draperies are cut and formed to precise alignment and exact dimensions.

These and other objects will become apparent from the following detailed description taken in connection with the accompanying drawings in which:

FIGURE 3 is an enlarged transverse sectional view of the carriage taken along line 3—3 of FIGURE 1;

FIGURE 4 is a horizontal sectional view of the carriage taken along line 4—4 of FIGURE 3;

FIGURE 5 is a longitudinal sectional view of the carriage taken along line 5—5 of FIGURE 1;

FIGURE 6 is a fragmentary perspective view, partially broken away, of the clamping portion of the carriage as seen from the inner side of the clamp;

FIGURE 7 is an enlarged transverse sectional view taken along line 7—7 of FIGURE 6, showing the cam arrangement for actuating one of the clamps;

FIGURE 8 is an enlarged fragmentary sectional view taken along line 8—8 of FIGURE 6, illustrating the stop for the actuating shaft of the larger clamp;

FIGURE 9 is an enlarged transverse fragmentary sectional view, showing the cam arrangement for the larger clamp;

FIGURE 10 is an enlarged fragmentary sectional view taken along line 10—10 of FIGURE 6, illustrating the stop for the actuating shaft of the shorter clamp.

Figure 1:
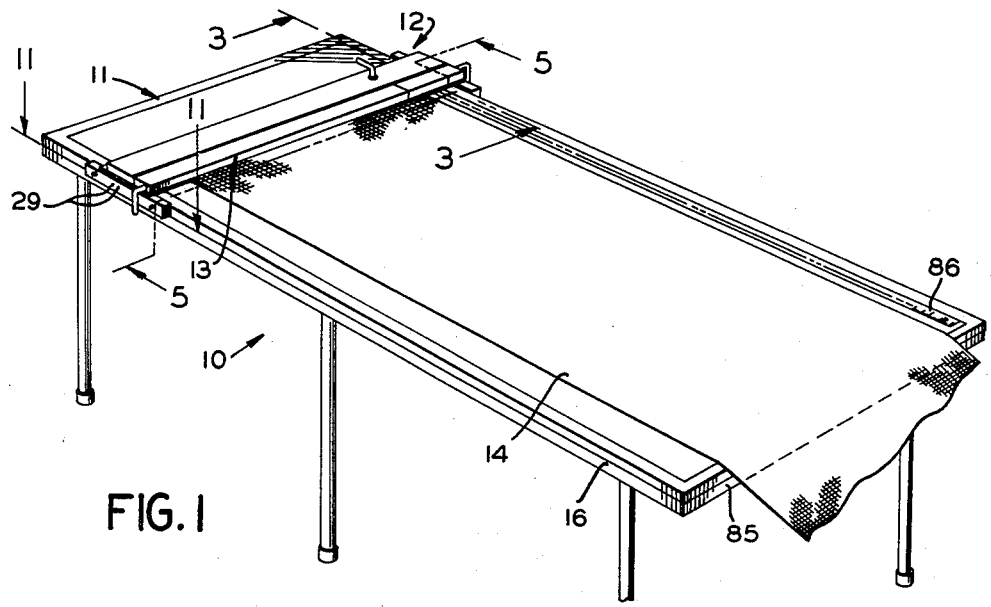
FIGURE 1 is a perspective view of the device of this invention.

With reference to the drawing, the device of this invention includes a table 10 having a rectangular top 11. A carriage 12 is movable lengthwise of the table top and can be positioned in any location along the length of the table. It includes a clamp assembly 13, adapted to receive and hold a sheet material 14, such as a length of cloth intended for the manufacture of draperies.

The upper portion of the table may be made of a base sheet 15 of ½-inch plywood. At its opposite side edges are fastened steel angles 16 and 17. Inwardly of these angles and above the sheet 15 is a pad of foam plastic material, such as open-cell polyurethane, which is covered by a sheet of canvas 19.

The carriage 12 includes a reinforced housing 21 that carries vertical flanges 22 and 23. These rotatably support pairs of wheels 24 and 25 that rest upon the upper surfaces of the angles 16 and 17 at the edges of the table top 11. This provides vertical support for the carriage and permits it to roll lengthwise of the table 10.

Extending along either end of the upper housing portion 21 of the carriage 12, and lengthwise with respect to the table 10, are U-shaped channels 27 and 28. Bolts 29 and 30 through the central portions of these channels support elongated leaf spring elements 31 and 32. At the outer ends of the members 31 and 32 yokes 33 and 34 pivotally mount pairs of wheels 35 and 36. These wheels engage the vertical flanges of the edge angles 16 and 17 of the table, thereby laterally positioning the carriage 12. Thus, the carriage engages both vertical and horizontal portions of the edge of the table top 11 and is constrained to a path lengthwise of the table, with the carriage extending transversely across the table top.

The clamp assembly 13 is mounted at one edge of the carriage and also extends transversely with respect to the table. The clamp assembly includes a first relatively long clamp 38 and a second shorter clamp 39. These clamps are secured to the carriage by piano hinges 40 and 41. These clamping elements are in the form of beams on the outer lower edges of which are gripping members 42 and 43. The latter strips include serrated under surfaces, as best seen in FIGURE 7, which facilitate their gripping and holding a length of cloth, as will be described below.

A straight vertical surface 47 extends along the side of the carriage 12 immediately beneath the hinges 40 and 41. This is perpendicular to a horizontal surface 48. The surfaces 47 and 48 are coated with thin layers of foam plastic, such as open-cell polyurethane.

In use of the device, the cloth 14 is positioned with its end resting on the surface 48 and its outer edge against the vertical surface 47, which thereby serves as an abutment in aligning the cloth with the carriage and table. The clamps 38 and 39 are pivoted downwardly to hold the cloth in this location.

Figure 2:
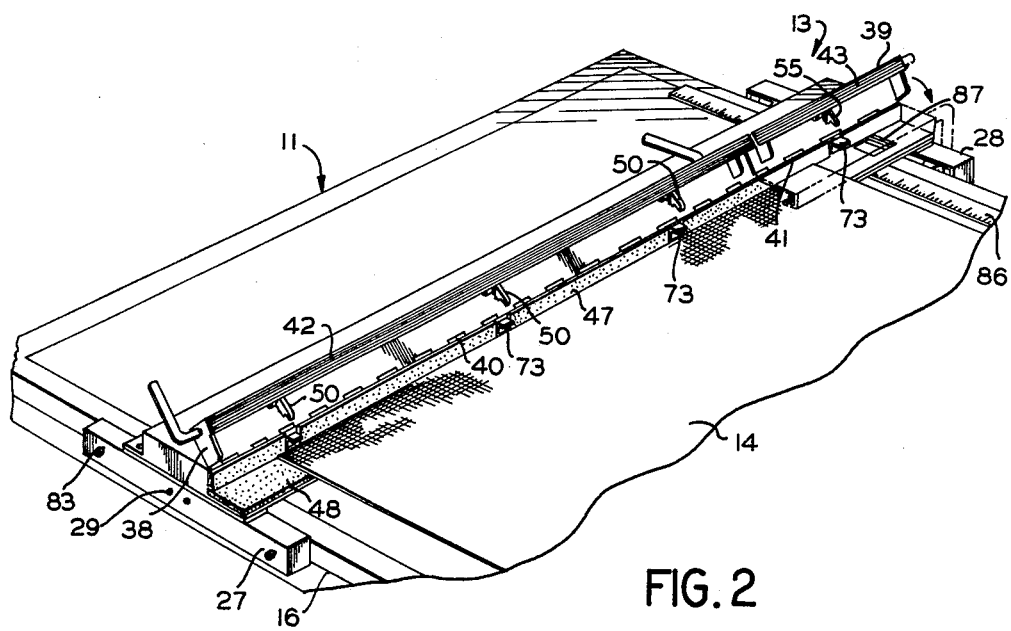
FIGURE 2 is an enlarged fragmentary perspective view, showing the clamping portion in the raised or released position.
Figure 11:
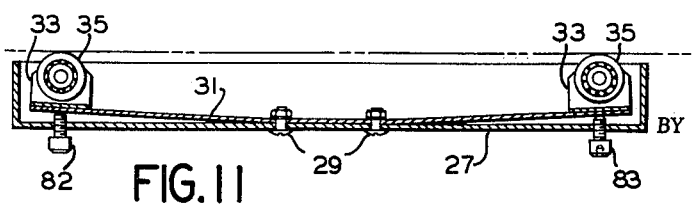
FIGURE 11 is a fragmentary sectional view taken along line 11—11 of FIGURE 1, illustrating the adjustment for alignment of the carriage.

In order to secure the clamps 38 and 39 in their lower positions, where they engage the edge of the cloth disposed on the table top, the clamp sections are provided with releasable locks. Hence, as seen in FIGURE 2, the clamp section 38 includes a plurality of levers 50, that act as the locks for this clamp section. As shown in detail in FIGURE 6, these levers are pivotal about pins 51 on brackets 52 carried by the clamp. Light wire springs 53 bias the levers 50 downwardly with respect to the clamp. Thus, as seen from the inside edge of the clamp as in FIGURE 6, the levers 50 are urged in a clockwise direction by the springs 53, and, in the sectional view of FIGURE 7, the rotational force is counterclockwise.

In a similar manner, the smaller clamp portion 39 carries a lever 55 which serves as the lock for this clamp and is pivotal about pin 56 extending through bracket 57, the lever 55 being loaded by light wire spring 58.

In order to rotate the levers 50 against the spring force, there is a shaft 59 extending along the clamp section 38, passing through the brackets 52 and above the end portions 60 of the levers 50 beyond the pivot pins 51. The shaft 59 includes cam portions 61 adjacent the levers 50 which are utilized in positioning the levers. Thus, with the flat surface of the cam portions 61 adjacent the end sections 60 of the levers 50, the levers can rotate counterclockwise downwardly as viewed in FIGURE 7 to the position shown in phantom lines. When shaft 59 is turned through 90°, however, its full diameter is presented to the lever ends 60. This rotates the levers 50 in a clockwise direction to the position shown in solid lines. A handle 62 is included at the end of the shaft 59 outwardly of the carriage to facilitate this movement of the shaft. Rotation of the shaft 59 is limited to approximately a 90° arc through provision of a pin 63 projecting through the shaft 59 and adapted to engage abutment surfaces 64 and 65 adjacent the shaft.

The smaller clamping portion 39 is actuated in much the same manner. Shaft 66 extends through the bracket 57 and includes a cam portion 67 above the end 68 of the lever 55 (see FIGURE 9). A greater degree of rotational movement is permitted for the shaft 66, which is stopped in its travel by pin 69 contacting abutment surface 70 on the bracket 57. This construction is illustrated in FIGURE 10. Hence, the handle 71 and the shaft 66 can rotate through approximately a 180° arc.

Projecting forwardly from the edge 47 of the carriage and above the horizontal surface 48 are tabs 73. These members are aligned with the levers 50 and 55. Therefore, in order to secure the clamp 38, it is pivoted about its hinge 40 to the lowered position, and the handle 62 is rotated through 90°. This causes the notched outer ends 74 of the levers 50 to fit beneath the tabs 73, locking the clamp in lowered position where the gripping surface 42 engages the edge portion of the cloth 14 that is positioned above the surface 48. Similarly, to close the clamp portion 39, this section is rotated downwardly about hinge 41 and the handle 71 is turned through a 180° arc. The outer end 75 of the lever 55 then contacts the under surface of the tab 73 in alignment with this lever and holds the clamp 39 in the lowered position.

The clamps may be loosened simply by reversing the above-described procedure. It is possible also, however, to release both clamps from the side of the short clamp 39. This allows both clamping sections to be shifted to the raised position from one side of the table. To this end, the shaft 66 is made slidable through the bracket 57 and the various supporting webs 76. The shaft 66 is biased outwardly by a compression spring 77 that is interposed between a web 76 and a cross pin 78. However, the shaft 66 may be moved inwardly in opposition to the spring 77, bringing the end of shaft 66 against the end of the longer shaft 59. There is a tongue 79 on the shaft 59 which is adapted to mate with a slot 80 on the shaft 66. Thus, in order to raise the two clamps simultaneously, the shaft 66 is shoved inwardly and engagement is made between the tongue 79 and the groove 80. Alignment to permit this occurs after the shaft 66 has been moved through approximately 90°. Then, for the remaining 90° of rotation, the shaft 66 rotates the shaft 59 as well by virtue of the coupling made at the tongue and groove connection at the ends of the shafts. Consequently, the levers 50 are released along with the lever 55. Then, with the shaft 66 so engaging the shaft 59 and the tongue 79 in the horizontal plane, upward movement on the clamp 39 will cause similar movement of the clamp 38. Hence, by rotating the clamp 39 about its hinge 41, the clamp 38 is pivoted about its hinge 40 simultaneously.

In use of the device of this invention, initially it is necessary to establish that the carriage is at right angles to the side edges of the table. That is to say, the vertical surface 47 against which the material 14 is brought should be perpendicular to the angles 16 and 17 defining the side edges of the table and the path of movement for the carriage. This may be set with precision by appropriate manipulation of screws 82 and 83 which are threadably received in the outer wall of the U-channel 27. These screws engage the outer surface of the spring member 32 which supports the pair of wheels 35 and, by differential movement of the screws 82 and 83, the angle of the carriage with respect to the table can be set with precision. Once this setting has been fixed, it will require no further attention, and the carriage will remain at right angles to the side edges of the table.

Next, the carriage is slid along the table top to position the edge surface 47 of the carriage a distance inwardly of the end 85 of the table to correspond to the particular length of material to be cut. Proper translational position of the carriage is established by viewing a scale 86 secured along the table top 11 adjacent the side edge 17. This scale is viewed through a small window 87 in the horizontal surface 48 immediately adjacent the vertical surface 47. Thus, the carriage is rolled along the table until, by looking through the window 87, it can be seen that the vertical edge 47 is at a desired distance inwardly of the end edge 85 of the table. When this is determined the carriage is locked in place.

In order to secure the carriage in the desired position, there is a vertical plate 88 adjacent the side edge 17 of the table, this plate having a friction material 89 at its lower edge. A rod 90 connects to the plate 88 and extends across the carriage through apertures in flange 23 and web 92. A yoke 93 threaded onto the end of the shaft 90 carries a pin 94 that extends through a slot 95 in a sector 96. The latter member is pivotal about a vertical pin 97 and rotatable by a lever 98 that extends above the carriage housing 21. The slot 95 is arcuate, but is closer to the pivot axis of sector 96 at one end than at the other. Consequently, in order to lock the carriage in any translational position along the table, the lever 98 is turned, thereby rotating the sector 96, which in turn moves the pin 94 inwardly as it slides in the arcuate slot 95. This moves plate 88 into engagement with angle 17 to lock the carriage in position. The wheels 35 carried by channel 27 on the opposite side of the carriage are clamped firmly against the angle 16 by the inward force of the plate 88. Because the wheels 35 are precisely positioned by virtue of the adjusting screws 82 and 83, this assures that the carriage is exactly at right angles to the sides of the table at the time the carriage is locked in a stationary condition to be used in holding the cloth 14. Locking the carriage in place, therefore, automatically assures that the vertical surface 47 is properly aligned.

With the carriage secured at the desired longitudinal position on the table 10, the material 14 is disposed on the table top. It is positioned at the carriage so that its edge rests upon the surface 48 and abuts against the vertical surface 47. Initially, one corner of the cloth 14 is secured by properly positioning the cloth at that location and clamping it in place with the short clamping section 39. Then the operator moves around the table to the opposite side and pulls the cloth taut along the horizontal surface 48, aligning the remaining portion with the vertical surface 47. Then the larger clamp 38 is secured. In this manner, the end of the cloth is quickly made completely smooth and without wrinkles and clamped securely in place. Then it is possible to cut the cloth flush with the outer edge 85 of the table.

In the manufacture of curtains, usually the edge 85 will be eight inches outwardly from the zero position on the scale 86. Then, when the operator folds the outer portion over a piece of crinoline, as customarily utilized in the manufacture of draperies, the result will be a drapery of precisely the desired length. In other words, the normal folding procedure at the end of the drapery material uses up the extra eight inches so that the resulting drapery is exactly the length indicated on the scale 86.

This completes the drapery-cutting operation and the section of cloth 14 then is released from the table. This is accomplished from one side of the machine simply by releasing the clamp 38 through the provision of the axially movable shaft 66, as described above. Thus, additional time is saved because it is unnecessary for the operator to move to both sides of the table in releasing the clamp. The operator needs to work on both sides of the table in securing the cloth, because this enables him to make the cloth smooth and taut. On the other hand, this is not required for the release of the cloth, and the invention takes advantage of this fact by permitting the cloth to be unclamped from one side.

The foregoing detailed description is to be clearly understood as given by way of illustration and example only, the spirit and scope of this invention being limited solely by the appended claims.

I claim:

1. A device for positioning material comprising
a substantially flat support surface having parallel opposed side edges and an end edge at right angles thereto,
a carriage movable along said support surface, said carriage including an abutment surface aligned transversely of said support member at right angles to said side edges,
and pivotal clamping means for securing the edge portion of a piece of sheet material aligned with said transversely extending surface,
said clamping means including means to secure said edge portion locally adjacent one of said opposed side edges,
and means to secure the remaining portions of said edge portion intermediate said opposed side edges.

2. A device for positioning material comprising
a substantially flat horizontal support surface having parallel side edges,
a carriage movable relative to said support surface,
said carriage having a transverse surface at right angles to said side edges,
and clamping means on said carriage for securing a piece of material aligned with said transverse surface,
said clamping means being segmented,
the segments of said clamping means being individually lockable and collectively releasable from one location.

3. A device for positioning sheet material comprising
a substantially flat support surface having parallel opposed side edges and an end edge interconnecting said side edges and at right angles thereto,
a carriage movable along said support surface,
said carriage including a straight upwardly extending abutment surface portion extending transversely of said support surface at right angles to said side edges of said support surface,
and having an additional surface projecting forwardly from the lower edge of said straight surface,
and a clamping means for securing a piece of sheet material on said additional surface in alignment with said transversely extending surface,
said clamping means including means for securing said piece of sheet material locally adjacent one of said opposed side edges,
and independently operable means for securing portions of said sheet material intermediate said opposed side edges
to provide clamping of substantially the entire width of said sheet material.

4. A device as recited in claim 3 in which said clamping means includes
a first portion adjacent one side edge of said supporting surface,
and a second and larger portion extending from said first portion to the other of said side edges,
said clamping portions being both releasable from the side edge adjacent said first clamping portion.

5. A device for positioning sheet material comprising
a table
having a rectangular top provided with parallel opposed longitudinally extending side edges,
and an end edge interconnecting said side edges and at right angles thereto,
a carriage extending transversely of said top,
support means for said carriage at said opposite side edges of said top
for permitting said carriage to move longitudinally of said top,
lock means for releasably and selectively securing said carriage in position along said table top,
said carriage having a vertical surface extending transversely of said top and at right angles to said side edges,
and a horizontal surface extending forwardly of said vertical surface toward said end edge of said top,
and clamping means for securing a piece of material on said horizontal surface,
said clamping means including a duality of members pivotal between a raised position remote from said horizontal surface,
and a lowered position in juxtaposition with said horizontal surface.

6. A device as recited in claim 5 in which said clamping means includes
a first relatively short clamping member at one side of said top
and a second longer clamping member extending from said first clamping member to the opposite side edge of said top and including release means for said clamping members operable from the location of said first relatively short clamping member.

7. A device as recited in claim 5 in which said clamping means includes
a first relatively short clamping member and a second longer clamping member,
hinge means pivotally connecting said first and second clamping members to said carriage adjacent the upper edge of said vertical surface and in end-to-end alignment
with said first clamping member extending inwardly from one of said side edges
and said second clamping member extending from said first clamping member to a position adjacent the other of said side edges,
a lock means for securing said second clamping member in a lowered position in juxtaposition with said horizontal surface,
said lock means being releasable from the location of said first relatively short clamping member.

8. A device as recited in claim 7 in which for said lock means there are included
pivotal levers on said clamping members,
a shaft on said first clamping member for actuating the pivotal lever of said first clamping member, a shaft on said second clamping member for actuating said pivotal lever of said second clamping member, each of said shafts including cam means for causing rotation of said pivotal levers, and coupling means for coupling said shafts together and permitting said shaft on said first clamping member to operate said shaft on said second clamping member for simultaneous release of said lock means.

9. A device for positioning drapery material or the like comprising a table
having a substantially flat rectangular top,
a carriage movable longitudinally of said top,
wheel means on said carriage for permitting said movement of said carriage,
a vertical surface on said carriage extending transversely of said top at right angles to the longitudinal edges of said top,
a horizontal surface on said carriage projecting outwardly at the bottom edge of said vertical surface,
a first clamp,
a second clamp,
hinge means pivotally connecting said clamps to the top edge of said vertical surface,
each of said clamps including a beam extending outwardly from said hinge means,
each of said beams having a surface at the lower outer edge thereof for engaging a sheet of material on said horizontal surface,
the beam of said first clamp being shorter than the beam of said second clamp and being adjacent one of said longitudinal edges,
a lock means for each of said beams,
said lock means being individually lockable, said lock means of said first beam being selectively operable to release the lock means of said second beam,
means for selectively securing said carriage along said table top,
and scale means on said table top for positioning said carriage at a predetermined distance inwardly from one end of said table top adjacent said horizontal and vertical surfaces of said carriage.

10. A device as recited in claim 9 in which said scale means includes indicia on said table top adjacent one of said longitudinal edges of said table top,
said indicia extending beneath said carriage,
said horizontal surface having a window therethrough adjacent said vertical surface for permitting said indicia to be seen and said vertical surface aligned therewith.

11. A device as recited in claim 10 in which said indicia has a zero marking,
and progressively higher markings inwardly from said end of said table top,
said zero marking being spaced inwardly of said one end,
whereby a piece of material cut flush with said end can be folded to provide a finished item of the length indicated on said indicia at said window.

12. A device as recited in claim 9 in which said wheel means includes at least one upstanding wheel rotatably mounted on said carriage and engaging said table top at either longitudinal edge of said table top,
a flexible member at either end of said carriage,
a substantially horizontally aligned pair of wheels carried in spaced relationship on either of said flexible members,
means connecting the central portion of each of said flexible members to said carriage
with the wheels thereof engaging the adjacent longitudinal edge of said table top,
and means for selectively adjusting the lateral positions of the ends of one of said flexible members with respect to the transverse dimension of said table top for thereby permitting transverse alignment adjustment of said carriage.

References Cited by the Examiner

UNITED STATES PATENTS

| | | | |
|---|---|---|---|
| 1,056,453 | 3/13 | Roberts | 269—154 |
| 2,189,797 | 2/40 | Hooper | 269—55 |
| 2,668,568 | 2/54 | Budd | 144—278 X |

ROBERT C. RIORDON, *Primary Examiner.*